U. DESALLIER.
CLEVIS.
APPLICATION FILED JULY 29, 1908.
912,089.
Patented Feb. 9, 1909.
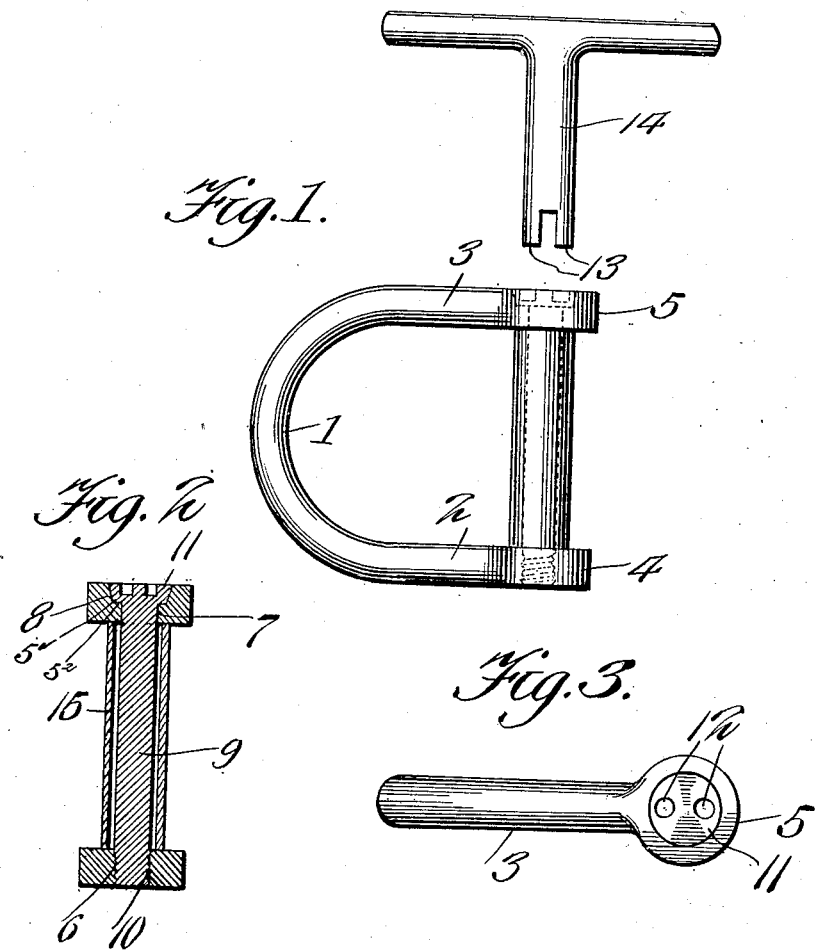
Witnesses
Wm Smith
C. C. Hinse
Inventor
Ubel Desallier
By Victor J. Evans
Attorney

UNITED STATES PATENT OFFICE.

UBEL DESALLIER, OF NORTH YAKIMA, WASHINGTON.

CLEVIS.

No. 912,089.     Specification of Letters Patent.     Patented Feb. 9, 1909.

Application filed July 29, 1908. Serial No. 445,988.

*To all whom it may concern:*

Be it known that I, UBEL DESALLIER, a citizen of the United States, residing at North Yakima, in the county of Yakima and State of Washington, have invented new and useful Improvements in Clevises, of which the following is a specification.

My invention relates to clevises and it consists in the construction and arrangement of parts as will be hereinafter described and particularly pointed out in the claim.

In the accompanying drawings, Figure 1 is a side elevation of the clevis and key. Fig. 2 is a cross section through the clevis. Fig. 3 is a top plan view of the clevis.

Referring to the drawing, the numeral 1 designates the U-shaped body or frame of the clevis, the arms 2 and 3 of which are terminally enlarged to form eyes 4 and 5 which may be of any preferred form. The eye 4 is provided with a threaded opening or recess 6, while the eye 5 is formed with a smooth cylindrical opening 7 enlarged at its outer end to form a tapered recess or countersink 8. Between the enlarged and smaller ends of the openings 7, I provide a shoulder 5'.

The clevis pin 9 is threaded at one end, as at 10, to fit within the opening 6, and its opposite end is adapted to be passed through the opening 7 and is provided with a tapered head 11 and a shoulder $5^2$ adapted when the pin is fully applied to occupy the recess 8, so that the outer surface of said head will lie flush with the outer surface of the eye 5 while the shoulder $5^2$ will contact with the shoulder 5' of the opening 7. The head is formed with a pair of spaced recesses 12 adapted to receive the spaced jaws 13 of a key or spanner wrench 14, by which the pin may be conveniently turned in the operation of applying and removing them. A sleeve or tube 15, incloses the pin 9 and is spaced therefrom, and its opposite ends are adapted to contact against the edges of the eyes when the pin is secured to the openings of the eyes, and said sleeve forms a bearing for the clevis when the same is applied to a swingle or double tree.

From the foregoing description, taken in connection with the drawing, it will be seen that a construction of pin and means for fastening the same is provided which adapts the pin to be easily applied and removed, and which insures the retention of the pin under all conditions of service. When the pin is fully applied, as clearly shown in Fig. 2, the threaded end of the pin lies flush with the outer surface of the eye 4, while the headed end of the pin lies flush with the outer surface of the eye 5, so that the pin is fully protected and has no projecting portions or ends liable to come in contact with extraneous objects. Hence, provision is made for preventing bending or breakage of the pin such as is liable to occur when the ends of the pin project beyond the clevis frame, and as the threaded portion of the pin is also fully inclosed liability of binding of the pin is obviated.

Having thus described the invention, what I claim, is:—

A structure of the character described comprising a U-shaped frame with arms having eyes at opposite ends, one of which is screw threaded and the other having an opening provided with a tapering recess having a straight portion therewith, a shoulder intersecting the tapering and straight portions of said opening, a pin having a screw threaded end and provided with a tapering head having a plurality of openings therein and also having a shoulder, a sleeve arranged between said eyes, said pin being inserted through the tapered and straight opening and through the sleeve and out of contact with the sleeve, means for engagement with said plurality of openings in the head whereby to turn the pin so that its threaded end will engage the said threads of the eye to permit of the said tapered portions of the head and its shoulder to respectively engage the tapered portion of the opening and its intersecting shoulder, and said turning of the pin also permitting of the opposite ends of the sleeve to contact against the edges of both of said eyes, substantially as specified.

In testimony whereof, I affix my signature in presence of two witnesses.

UBEL DESALLIER.

Witnesses:
    O. A. FECHTER,
    E. E. STRUTZ.